INVENTORS:
Herbert L. Hubbard
Willis B. Morris
Their Patent Attorney

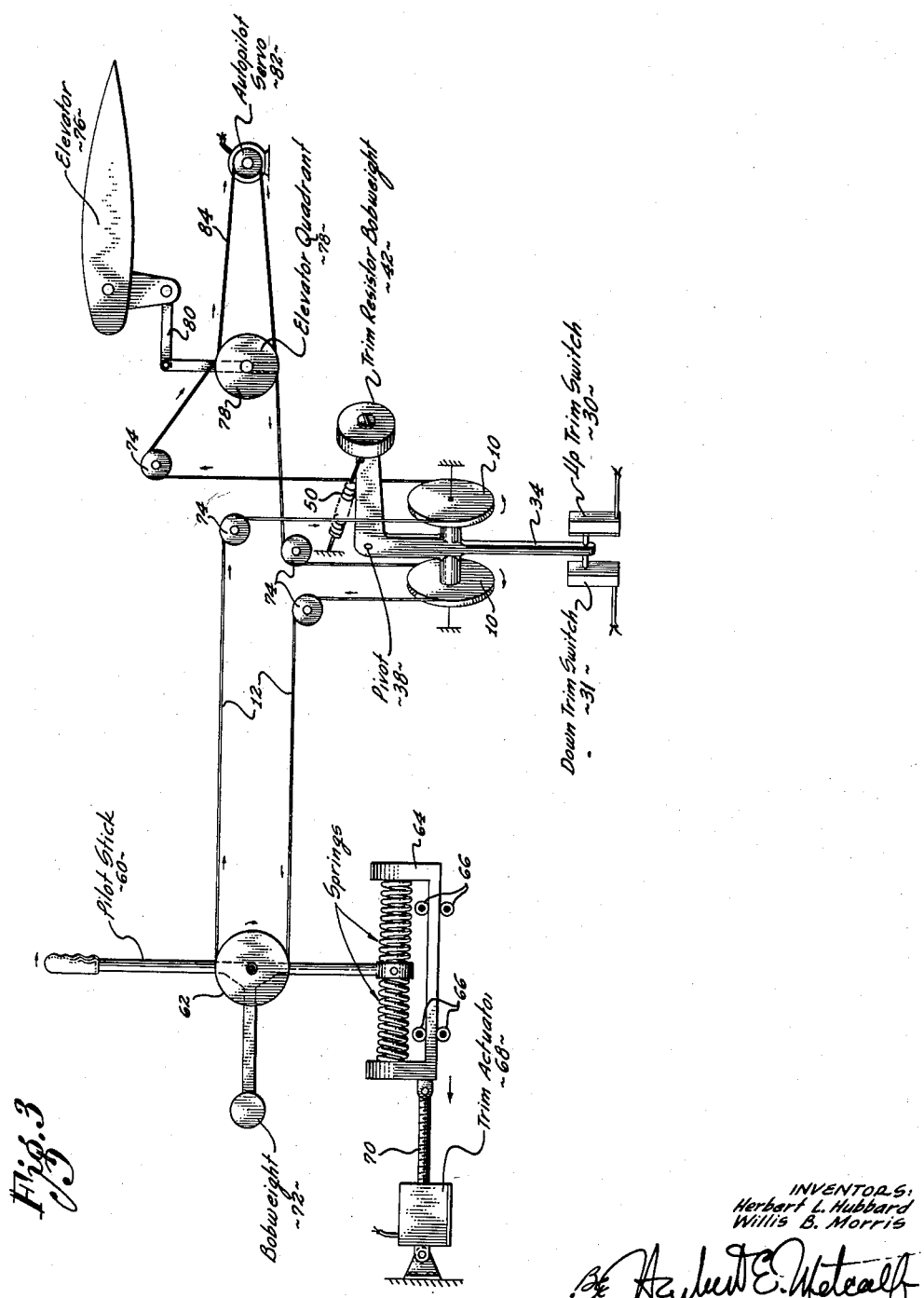

United States Patent Office 2,923,498
Patented Feb. 2, 1960

2,923,498

FLIGHT CONTROL SYSTEM AUTOMATIC TRIM MECHANISM

Herbert L. Hubbard, Inglewood, and Willis B. Morris, Hawthorne, Calif., assignors to Northrop Corporation, Hawthorne, Calif., a corporation of California Application December 26, 1956, Serial No. 630,575

6 Claims. (Cl. 244—76)

This invention has to do with an automatic trim mechanism that is a part of an aircraft flight control system.

Where automatic trim mechanism is used in an aircraft flight control system, the object is to reduce to zero, the steady state force at the control stick and/or the steady state torque at the autopilot servo, which is a result of the displacement of the system to a new trim position. The automatic trim mechanisms presently in use are actuated by a displacement of a component of the control system. In other words, the automatic trim mechanism is energized when the force producer is displaced. Attention is directed to the fact that the differential of forces that occur in the cable control system in the presently used mechanisms do not energize the automatic trim mechanism. Instead, displacement of the force producer, a result of system displacement, causes the actuation of the automatic trim mechanism. There are a number of reasons why the principle of displacement is not the ideal mechanical system, but one reason is that the differential of forces involved, in the cable control system do not actuate the trim mechanism despite the fact that these very forces are the reason a trim mechanism is required.

The invention to be considered herein deals directly with the forces involved and is not inhibited, restricted or unnecessarily influenced by the displacement of certain mechanical components.

An object of this invention is to provide an aircraft flight control system automatic trim mechanism that is energized by the differential of forces that occur in the cable control system as the result of displacement, to a new trim position of an aircraft control surface.

Another object of this invention is to provide an aircraft elevator flight control system automatic trim mechanism that includes a counter bob weight. This counter bob weight opposes operation of the automatic trim switch when the force producer bob weight imposes, as a result of acceleration influences, a differential of forces in the cable control system. The force producer bob weight forces oppose over control, and the counter bob weight prevents such forces from actuating the automatic trim mechanism.

A yet further object of this invention is to provide an aircraft flight control system automatic trim mechanism that may be readily installed in an aircraft, economically fabricated, and easily maintained.

Figure 3 is a schematic illustration of a typical aircraft flight control system including the autopilot and illustrating the relationship of the present invention as it may be applied and installed.

Figure 1:
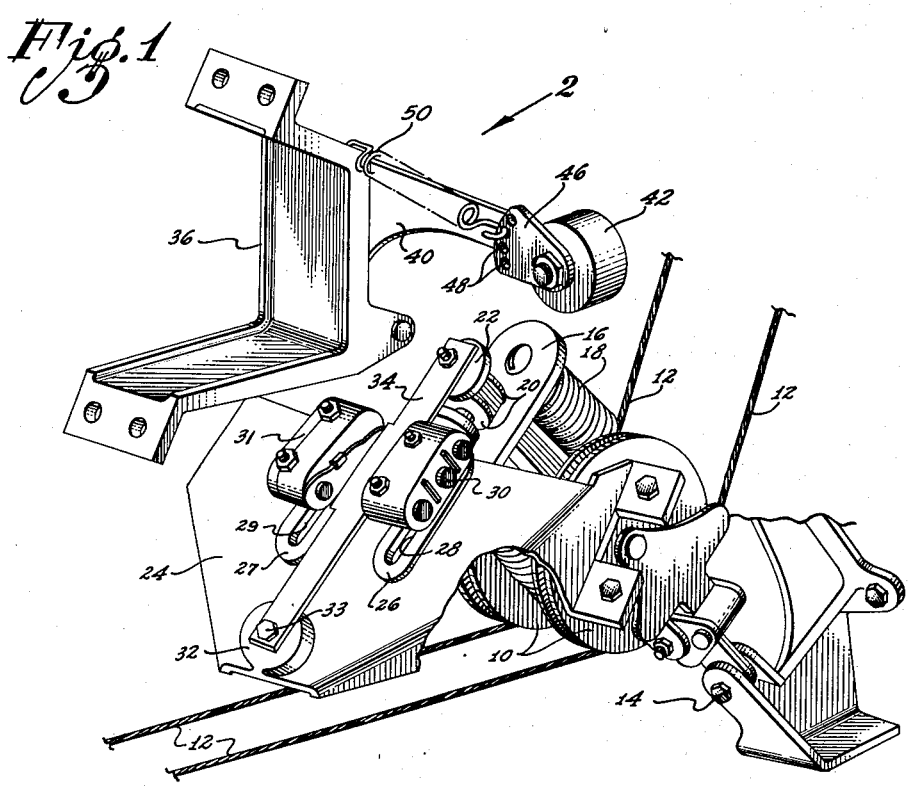
Figure 1 is a fragmentary, perspective view illustrating and having embodied therein the present invention.
Figure 2:
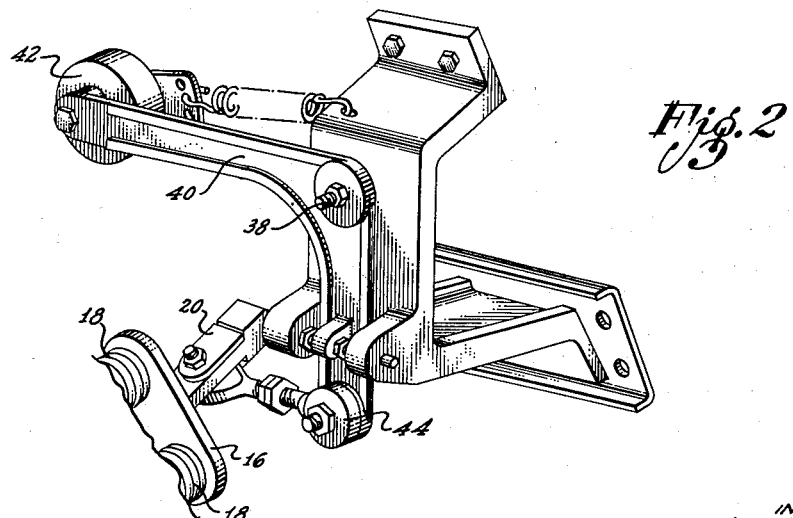
Figure 2 is a view of a counter bob weight taken from Figure 1 looking in the direction of the arrow identified by the Numeral 2.

Referring to the drawings for a more detailed description of the present invention 10 designates a pulley assembly including two rotatable cable pulleys. This pulley assembly which is spring loaded, may, for purposes of illustration only, be defined as a cable tension regulator. Threaded over each pulley is, for all intents and purposes an endless, cable 12. Additionally, the pulley assembly is mounted in such a manner that when a differential of force is established in the cable 12 they will pivot at 14 in the direction of the greatest force.

On the bracket 16, that connects the springs 18 of the pulleys, are a pair of ears 20 that receive a fitting 22.

A support mounting 24, of the type illustrated in Figure 1, is suitably mounted on any convenient structure of the aircraft.

A pair of spaced apart, and parallel bracket tracks 26 and 27 having slots 28 and 29 therein are secured to the support. Mounted on each bracket track and in each slot, for purposes of adjustment is a switch 30 and 31 respectively. One switch may be designated as a down trim switch, 31, and one the up trim, 30, as indicated by the legend in Figure 3.

A boss 32 is provided on the support, and pivotally attached at 33 is an elongated lever or beam 34. The beam extends between the switches 30 and 31 and that end of the beam opposed to the pivot 33 is fixed to a spherical bearing in fitting 22.

A second support mounting 36 is also attached to any convenient structure of the aircraft. Pivotally attached at 38 to the support is an L-shaped lever 40 having a weight 42 on one extreme end. The opposed extreme end of the lever 40 is attached to a link 44 that is in turn attached to one of the ears 20.

The weight 42 has an adapter 46 thereon that has a plurality of openings 48 therethrough which are to receive one end of a compression spring 50. The opposite end of the spring its attached to the support 36.

Attention is directed to the schematic illustration of the flight control system depicted in Figure 3. It is to be understood that the illustrated structure is a mere representation of conventional and well known aircraft components.

A pilot stick 60 having a quadrant 62 thereon, intermediate the ends, is connected to a reciprocable force producer 64. The force producer, as represented, for purposes of convenience rides back and forth between rollers 66. A trim actuator 68 is connected to the force producer through the medium of a jack screw 70.

Also on the control or pilot stick 60 is a bob weight 72 that is influenced by accelerations that occur as the result of changes in the pitch attitude of the aircraft.

A series of pulleys 74 are located throughout the aircraft structure and over and about these pulleys is threaded cable 12. This cable 12 is, as previously stated, threaded about pulley assembly 10. Further, between pulley assembly 10 and the control surface 76 is a final or elevator quadrant 78. Between quadrant 78 and the control surface 76 and connecting the two together is a linkage system 80 that is representative of conventional equipment.

An autopilot 82, that may be considered a servo system, through the closed cable system 84, is also connected to the quadrant 78.

The control surface illustrated is the elevator, but it could also be the rudder, ailerons, or elevons.

The various quadrants and pulleys illustrated along with the cables 12 and 84, as well as the bob weight 72 may be considered the cable control system.

The operation of the invention described is as follows: Assume the aircraft is flying on autopilot and it is desirable that it maintain straight and level flight.

As a result of some change that may occur due to changes in flight characteristics, such as the consumption of fuel, it is necessary that the elevator be rotated about its axis to an up condition. The autopilot 82 receives such a signal and through the cable 84 rotates the quadrant 78 in the direction indicated by the force arrow.

Further, assume that the cable 12 has under normal straight and level flight conditions 10 pounds of force on that part going from the pilot stick 60 back to quadrant 78 and 10 pounds of force on that part going from the quadrant back to the stick.

When the quadrant 78 is rotated by the autopilot servo to change the attitude of the surface 76 a change in forces occurs due to a displacement of the force producer spring, in the cable 12, as indicated by the various force arrows. It may, for purposes of discussion, be assumed that that part of the cable from the stick 60 has 15 pounds of force; and that part back to the stick is reduced to 5 pounds.

As a result of these change of forces the pulley assembly 10 rotates about pivot 14. This rotation of the pulley assembly 10 causes lever 34 to rotate resulting in one switch 30, in this case the up trim switch, going to the up position. Operation of the up trim switch actuates the trim actuator.

When the change in the position of quadrant 78 occurs this change is transmitted to the spring of the force producer 64 and the spring is displaced in the direction of the arrows, resulting in a differential load in the cables.

As the trim actuator is energized the force producer is moved in a direction to reduce the differential cable force. As the differential cable force is removed the cable forces return to 10 pounds each, the pulley assembly 10 rotates to the neutral position, the up trim switch moves to the off position, and the trim actuator is de-energized.

In the event the surface 76 is to be moved to a down position the force arrows are to be reversed.

It may be readily seen that the initial object of this invention has been fulfilled and that there is provided an aircraft flight control system automatic trim mechanism that is energized by differential forces that occur in the cable control system as the result of displacement to a new trim position of an aircraft control surface.

Now consider the fact of the bob weight 72 which acts to prevent overcontrol in the pitch axis, and the counter bob weight 42 and lever 40.

An acceleration which is the result of a change of pitch attitude of the flying aircraft causes the bob weight 72 to produce a torque about its axis in a direction to oppose the pitch signal. This torque causes a force differential to occur in the cable 12 which normally would result in rotating the pulley assembly 10 about pivot 14. However, as it is not desired to trim out the bob weight acceleration forces, a counter bob weight 42 on lever 40 is so positioned with respect to the pulley assembly 10 and is of such a weight as to counter the forces that are imposed on the pulley assembly. In other words, the differential of forces that are imposed on the cables 12 by the bob weight 72 tend to cause the pulley assembly 10 to rotate about its axis in the same manner as if the autopilot were the cause. However, the counter bob weight 42 is affected by the same cause that produced the torque from the bob weight 72, but in such a manner as to resist the rotation of the pulley 10. As a result the pulley assembly 10 is not rotated, the trim actuator is not energized by the switches 30 and 31, and the differential forces established in the cable 12 is not removed.

While in order to comply with the statute, the invention has been described in language more or less specific as to structural features it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

We claim:

1. Trim switch mechanism for an aircraft flight control system comprising a closed cable control system that is actuated by a servo system to cause a differential in cable forces, a control surface, the attitude of which is altered by the servo system; a force producer into which a force is urged, by the cable system when a differential of forces is established in the latter; a pulley assembly considered a part of said cable system, that pivots when differential forces are established in said cable system; pivotal means interconnected to said pulley assembly; and switches, adjacent to and actuated by said means, that are connected to a trim actuator to actuate the same to trim the differential of forces out of the force producer and cable control system.

2. In an aircraft flight control system having a control surface actuated by a servo system, a closed cable control system also actuated by said servo system to cause a force differential therein, a force producer actuated by said cable system, a trim actuator, and a flight control system automatic trim mechanism comprising pivotal cable pulleys that are a part of said cable control system and which pivot when said force differential is established therein; pivotal means interconnected to said pulleys; and at least one trim actuator switch adjacent and operated by said means to actuate the trim actuator which substantially equalizes the differential of forces in said cable system and force producer.

3. Trim switch mechanism for an aircraft flight control system comprising a closed cable control system that is actuated by a servo system to cause a differential of forces therein; a control surface, the attitude of which is altered by the servo system; a force producer into which a differential of forces is urged, by the cable system, when a differential of forces is established in the latter; a pulley assembly that is a part of said cable system, that pivots when differential forces are established in said cable system; pivotal means interconnected to said pulley assembly; switches adjacent to and actuated by said means, that are connected to a trim actuator to actuate the same and trim the differential of forces out of the force producer and cable control system; a bob weight in the cable control system that is influenced by accelerations which are due to a change in pitch attitude of the aircraft to impose a differential of forces in said cable system independent of as well as concurrently with said servo system and a counter bob weight interconnected to said pulley assembly that prevents these forces imposed on said pulley assembly from causing operation of the trim mechanism.

4. Trim switch mechanism for an aircraft flight control system comprising a closed cable control system that is actuated by a servo system to cause a differential of forces therein; a control surface, the attitude of which is altered by the servo system; a force producer into which a force is urged, by the cable system, when a differential of forces is established in the latter; a pulley assembly that is a part of said cable system, that pivots when differential forces are established in said cable system; pivotal means interconnected to said pulley assembly; switches adjacent to and actuated by said means, that are connected to a trim actuator to actuate the same to trim the differential of forces out of the force producer and cable control system; and a pivotal bob weight interconnected to said quadrants that resists random acceleration forces imposed on said pulley assembly, to prevent the latter from causing operation of the trim actuator.

5. Trim switch mechanism for an aircraft flight control system comprising a closed cable control system that is actuated by a servo system to cause a differential of forces therein; a control surface, the attitude of which is altered by the servo system; a force producer into which a differential of forces is urged, by the cable system, when a differential of forces is established in the latter; a pair of connected cable pulleys that are a part of said cable system, that pivot when differential forces are established in said cable system; pivotal means interconnected to said pulley assembly; switches, adjacent to and actuated by said means, that are connected to a trim actuator to actuate the same to trim the differential of forces out of the force producer and cable control system; and an element interconnected to said pulley assembly that prevents pitch acceleration forces from operating the trim mechanism.

6. Trim switch mechanism for an aircraft flight control system comprising a closed cable control system that is actuated by a servo system to cause a differential of forces therein; a control surface, the attitude of which is altered by the autopilot; a force producer into which a differential of forces is urged, by the cable system, when a differential of forces is established in the latter; a pulley assembly of connected cable pulleys that are a part of said cable system, that pivot when differential forces are established in said cable system; pivotal means interconnected to said pulley assembly; switches, adjacent to and actuated by said means, that are connected to a trim actuator to actuate the same to trim the differential of forces out of the force producer and cable control system; a principal bob weight in the cable control system that is influenced by accelerations due to changes in pitch attitude of the aircraft to impose a differential of forces in said cable system independent of as well as concurrently with said servo system; and an element interconnected to said pulley assembly that resists the principal bob weight forces imposed on said pulley assembly, and prevents a reduction of the differential of forces established by said principal bob weight.

References Cited in the file of this patent
UNITED STATES PATENTS

| | | |
|---|---|---|
| 2,341,273 | Helberg | Feb. 8, 1944 |
| 2,612,329 | Crandall et al. | Sept. 30, 1952 |
| 2,719,684 | Peed | Oct. 4, 1955 |
| 2,772,841 | Bonsteel | Dec. 4, 1956 |